United States Patent [19]
Eckert et al.

[11] 3,961,828
[45] June 8, 1976

[54] TWO-CIRCUIT BRAKING SYSTEM FOR MOTOR VEHICLES EMPLOYING A WHEEL LOCK-PREVENTION DEVICE

[75] Inventors: Konrad Eckert, Stuttgart; Alexander Von Lowis, Mauren; Klaus-Otto Riesenberg, Ludwigsburg-Ossweil, all of Germany

[73] Assignee: Robert Bosch G.m.b.H., Stuttgart, Germany

[22] Filed: Jan. 25, 1974

[21] Appl. No.: 436,781

[30] Foreign Application Priority Data
Jan. 25, 1973 Germany.............................. 2303505

[52] U.S. Cl. ............................................ 303/21 AF
[51] Int. Cl.² ...................................... B60T 8/00
[58] Field of Search................. 188/181 A; 303/6 C, 303/21 F, 21 FM, 21 SV, 21 AF, 21 CE, 21 CF, 21 CG, 21 H

[56] References Cited
UNITED STATES PATENTS

| | | |
|---|---|---|
| 3,674,317 | 7/1972 | Mangold..................... 303/21 AF X |
| 3,722,960 | 3/1973 | Von Lowis................. 303/21 FM X |
| 3,788,710 | 1/1974 | Von Grunberg et al. ... 303/21 AF X |

*Primary Examiner*—Duane A. Reger
*Attorney, Agent, or Firm*—Edwin E. Greigg

[57] ABSTRACT

What follows is the description of a two-circuit braking system for motor vehicles having a wheel lock-prevention device. Each circuit includes magnetic valves, while the system includes a switching valve and bypass line structure connecting at least one of the two circuits to the switching valve. The switching valve is associated with a threshold value such that the switching valve is switched in dependence on the threshold value causing the bypass line structure to be placed into open communication with its respective circuit. In such a situation at least some of the magnetic valves are rendered ineffective so that a braking pressure increase without lock-prevention is achieved.

10 Claims, 4 Drawing Figures

TWO-CIRCUIT BRAKING SYSTEM FOR MOTOR VEHICLES EMPLOYING A WHEEL LOCK-PREVENTION DEVICE

BACKGROUND OF THE INVENTION

The present invention relates to a two-circuit braking system for motor vehicles employing a lock-prevention device which holds the braking pressure below the locking limit by means of sensors and magnetic valves.

A braking system of this kind is known and disclosed in German Offenlegungsschrift No. 2,038,271. The known braking system has one magnetic inlet valve and one magnetic outlet valve for each braking circuit I and II, and, in addition, has other valve elements which are all susceptible to malfunction as is well known. The correct functioning of a braking system of this kind can be impeded by a fault in the system, for example, by an incorrect switching of the magnetic valves, with the result that a total or a partial failure of the braking system is possible. A failure of the front axle brake is particularly dangerous because without braking capacity at the front wheels, the largest part of the braking capacity of the vehicle is lost because a dynamic load shift to the front axle occurs.

OBJECTS AND SUMMARY OF THE INVENTION

It is, therefore, an object of the present invention to avoid the shortcomings of such a known braking system as that described above and to guarantee operational reliability so that a pressure buildup in the brake cylinders of the vehicle occurs in all cases during braking.

It is another object of the present invention to provide a particularly simple braking system for motor vehicles of the type described.

These and other objects are achieved according to the present invention in that a switching valve is provided with the lock prevention device which switches over in dependence on a threshold value and opens a bypass line as a result of which at least a part of the magnetic valves are rendered ineffective in order to achieve an increase in the braking pressure without lock prevention.

According to an advantageous characteristic of the present invention, switching in the bypass line renders the magnetic valves assigned to the front axle of the vehicle ineffective, in order to achieve a braking pressure increase in the front axle circuit without brake prevention. In this way the braking capability of the front wheels is guaranteed for all cases; and further, the largest part of the braking capability, as well as the stability of the vehicle, is maintained because of the still effective rear axle lock prevention.

According to a further advantageous characteristic of the present invention, a pressure difference between the two braking circuits I and II, which can occur due to a faulty position of at least one magnetic valve of the front axle, actuates the switching valve after reaching the threshold value.

In this way it is possible to disconnect the lock-prevention depending on the braking pressure diifference in the two braking circuits I and II. Further advantageous characteristics of the present invention will become apparent from the specification and claims that follow.

BRIEF DESCRIPTION OF THE DRAWING

Several exemplary embodiments of the present invention are represented in the drawing, according to which.

DESCRIPTION OF THE PREFERRED EMBODIMENTS

Figure 1:
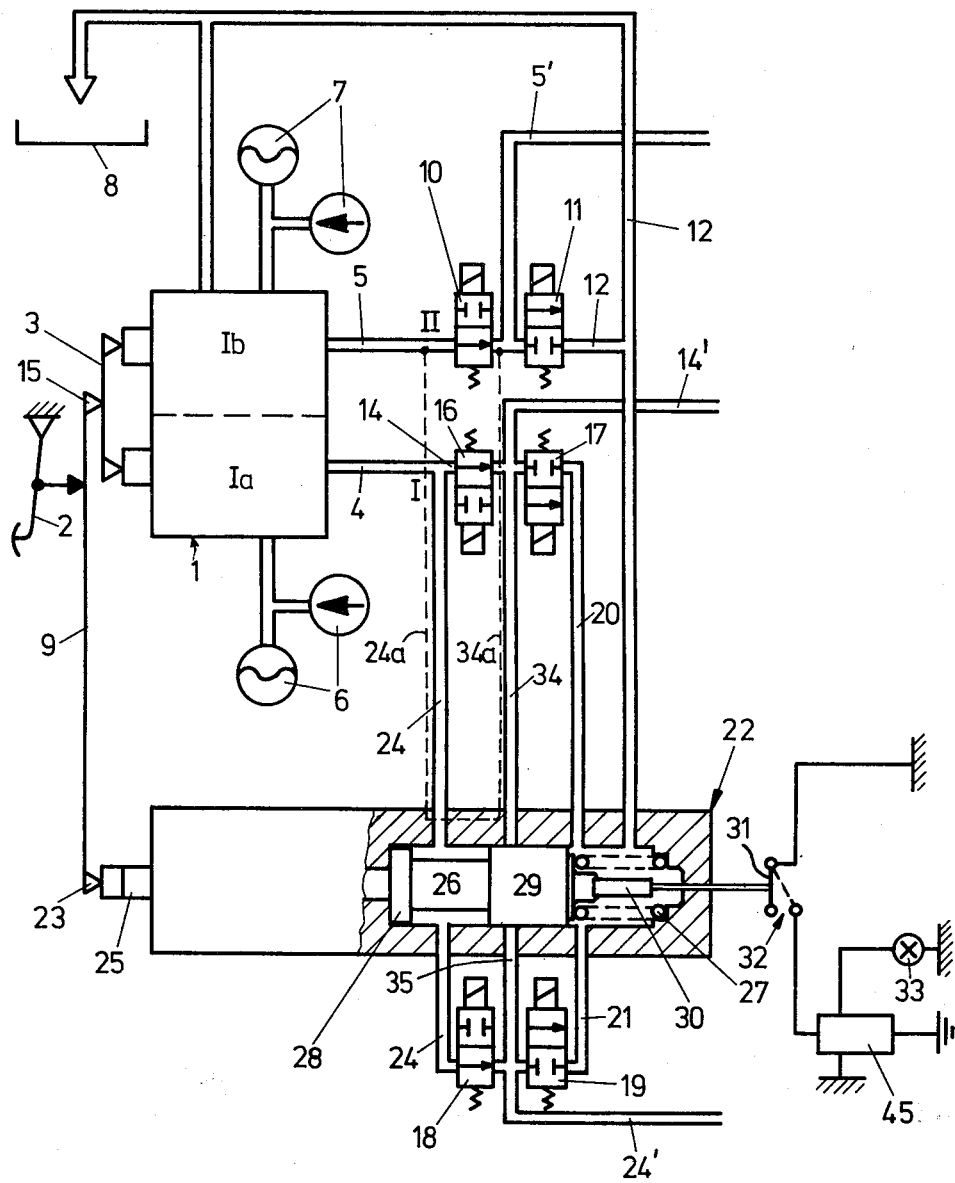
FIG. 1 illustrates a two-circuit braking system including a switching valve with mechanical actuation of the switching valve.

A two circuit braking system is developed as an external power brake. It has a dual braking valve 1, which is actuated by a foot pedal 2 via a beam 3. The braking valve 1 can establish a connection for each individual valve 1a or 1b between a brake line 4 or 5 and a pump and storage combination 6 or 7, or with a fluid reservoir 8. The brake line 4 is part of a front axle braking circuit I, and the brake line 5 is part of a rear axle braking circuit II. Within the brake line 5 assigned to the rear axle braking circuit II, there are disposed two 2/2 magnetic valves 10 and 11, of which one (10) acts as an inlet valve and the other (11) acts as an outlet valve. The brake line 5 extends from between the magnetic valves 10 and 11 as a brake line 5' to the rear wheel brakes, which are not shown, and a relief line 12 extends from the outlet magnetic valve 11 back to the reservoir 8 and to a switching valve 22.

The brake line 4 of the front axle braking circuit I is divided into two partial lines 14 and 24. The line 14 leads to a magnetic valve pair 16/17 consisting of an inlet valve 16 and an outlet valve 17, and the line 24 leads through the switching valve 22 to a magnetic valve pair 18/19 consisting of an inlet valve 18 and an outlet valve 19. The brake line 14 extends from between the valve pair 16/17 as brake line 14' to a brake cylinder (not shown) of the left front wheel, and the brake line 24 extends from between the valve pair 18/19 as brake line 24' to a wheel brake cylinder (not shown) of the right front wheel. A relief line 20 and 21 extends from outlet valve 17 and 19, respectively, through the switching valve 22 to the relief line 12. Bypass lines 34 and 35 lead from the switching valve 22 to the brake lines 14' and 24', respectively.

The pedal 2 does not act directly on the beam 3 actuating the braking valve 1, or on the switching valve 22, rather a further second beam 9 is interposed, whose one end 15 rests on the beam 3 and whose other end 23 rests against a setting rod 25 of the switching valve 22.

Within the switching valve 22 there is disposed a control slide 26, which can be actuated by means of the setting rod 25 and in opposition to the force of a spring 27. The control slide 26 has two pistons 28 and 29, of which piston 29 operates as a control piston with one of its control edges controlling the connection of the lines 14' and 24' through the bypass lines 34 and 35, and with its other control edge controlling the connection of lines 20, 21 and 12.

The control slide 26 carries a switching rod 30, adjacent to one side of the spring 27, and the other end of which can cooperate with a movable contact 31 of an electric switch 32. The switch 32 is connected to an electronic switching circuit 45 and is part of the electric circuit of a warning lamp 33, installed on the dashboard of the motor vehicle.

The two-circuit braking system described above and illustrated in FIG. 1 operates as follows:

During the braking action, when the lock-prevention device is functional and when the brake pedal 2 is actuated in the usual manner and given a frictional coefficient of the road surface of 0.4 to 0.5, the lock-prevention magnetic valves 10/11, 16/17 and 18/19 and the switching valve 22 do not change from the position shown in FIG. 1. The lock-prevention functions when sensors (not shown) respond to the tendency of the wheels to lock and switch over the magnetic valve pair 10/11 in the rear axle brake circuit II and/or the magnetic valve pairs 16/17 and 18/19 in the front axle brake circuit I. In that case, the brake lines 5' and/or 14' and 24' are pressure relieved, at least for a short period of time, and the brake pressure is reduced.

Normally, a braking action of this kind suffices to sufficiently decelerate the vehicle. However, several circumstances may lead to a situation where the driver exerts a greater force on the brake pedal. These could be, for example:

1. A rough driving surface (dry concrete) permits a higher braking force and therefore permits higher deceleration without locking of the wheels. In such a case, the function of at least the front axle lock-prevention is not necessary; or
2. When the frictional coefficient of the road is low, the driver attempts to over-exert the brake, i.e. the driver demands more deceleration than the quality of the road permits; or
3. The lock-prevention is defective. The driver cannot achieve the deceleration which would be inherently possible from the condition of the road. This is especially true when a magnetic valve of the front axle lock-prevention is defective.

If, in one of these three cases, a threshold force value, set by the pretension of the spring 27 within the switching valve 22, is exceeded by a strong actuation of the brake pedal 2 (i.e. force-dependent), then the control slide 26 moves to the right, compressing the spring 27. The piston 29 opens communication between the bypass lines 34 and 35 leading to the brake lines 14' and 24', and closes the relief line connection to line 12, so that the full braking action may take place at the front wheels with the cut-out of the lock-prevention. Locking of the front wheels does not adversely affect the straight steering of the vehicle, it causes the front of the vehicle to lose road adhesion, the rear portion of the car is kept on the road by the decelerating and road holding rear wheels. This produces an effect which may be illustrated by a vehicle being pulled backwards using a means hooked on to the center in the rear. While the vehicle can no longer be steered it will continue to drive in the same direction. Because the rear of the vehicle is subject to forces acting like pulling it backwards, there cannot be any side slip.

In this position of the switching valve 22, the switch 32 closes the circuit for the warning lamp 33 by means of the electronic switching circuit 45, so that the driver is informed that his front wheel lock-prevention device has been cut out.

In this embodiment, as soon as the front axle lock-prevention is cut out, it is possible as well to cut out the rear axle lock-prevention or the entire lock-prevention, by installing the switching valve 22 by either itself or supplementarily in the rear axle brake circuit II (see FIG. 1, dotted lines 24a and 34a).

Figure 2:
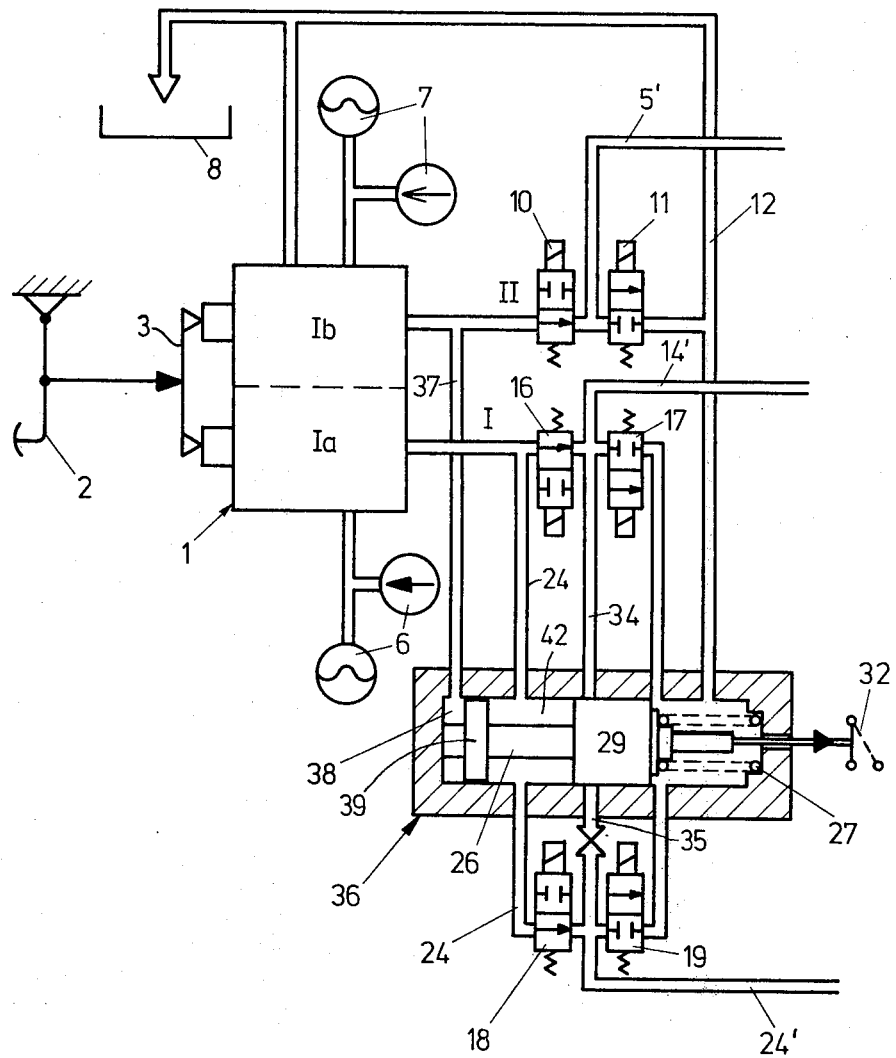
FIG. 2 illustrates a two-circuit braking system including a switching valve with a pressure difference dependent actuation of the switching valve.

FIG. 2 illustrates a two-circuit brake system similar to that of FIG. 1, with similar reference numerals being used for similar parts. In this embodiment, however, the lever 9 is omitted and a switching valve 36 is provided which is not actuated mechanically and force-dependently, but is actuated hydraulically and pressure-dependently. According to this embodiment, the rear axle braking circuit II is connected to a switching chamber 38 through a line 37, while the front axle braking circuit I is connected to a chamber 42 of the switching valve 36 through the line 24. Between the switching chambers 38 and 42 lies a switching piston 39, embodied as a movable wall, which is fastened to the control slide 26 of the switching valve 36 just as is the control piston 29.

In this braking system the switching valve 36 is switched when the braking pressure in the rear axle brake circuit II exceeds a given pressure level or when the pressure in the front axle brake circuit I does not build up because of a failure of a front axle magnetic valve 16, 17, 18 or 19.

In this case, however, it one of the magnetic valves 10 or 11 of the rear axle brake circuit II fails, little or no pressure builds up in the switching chamber 38, and the switching valve 36 is not actuated. This situation can be overcome by the construction of FIG. 3.

Figure 3:
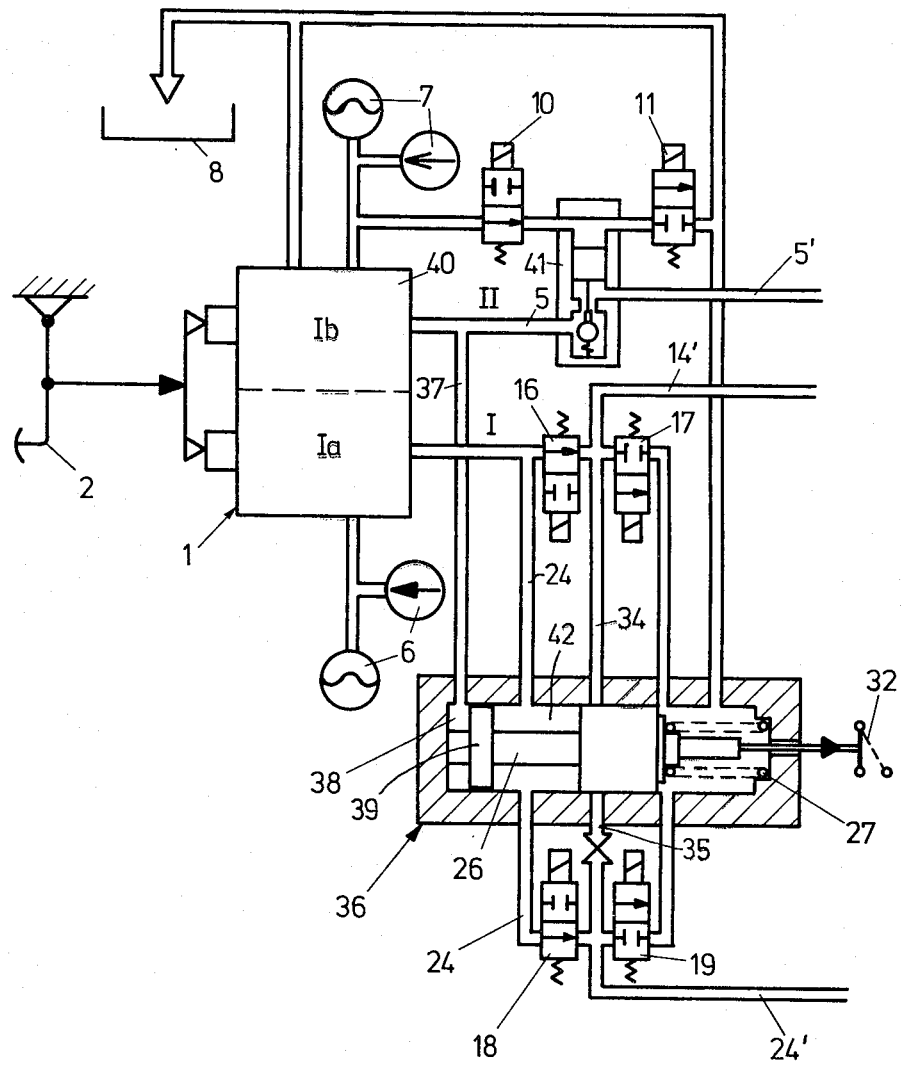
FIG. 3 illustrates a braking system similar to that illustrated in FIG. 2, however with a mixed external power-auxiliary power brake and a reduction valve in the rear axle brake circuit II.

FIG. 3 illustrates a braking system in which there is provided an externally actuated brake in the front axle braking circuit I, while in the rear axle braking circuit II there is provided an auxiliary force brake with a main brake cylinder 40 and a reduction valve 41 lying between the magnetic valve pair 10/11. In this embodiment, similar elements use the reference numerals used in FIGS. 1 and 2.

This embodiment has the advantage that, even during a malfunction of all valves, i.e. not just of the lock-prevention magnetic valve pairs 16/17 and 18/19, but also of the lockprevention magnetic valve pair 10/11 of the rear axle brake circuit II, the switching of the switching valve 36 is guaranteed. This is because if the magnetic valves fail, the reduction valve 41 keeps the rear axle brake line 5 closed, so that the brake line pressure in 5 is not reduced.

There are lock-prevention systems which employ a safety circuit, by means of which the duration of the energization of the magnetic outlet valve is checked. If the duration of the energization exceeds a predetermined value, the outlet valve is shut off again and the outlet is closed. After that, a brake line pressure build-up is possible again.

According to still a further embodiment of the present invention, the switch 32 (FIG. 1), which is closed after switching of the switching valve 22, influences a safety circuit, installed in the electronic switching system 45 to control the length of the turn-on duration of the magnetic outlet valve, in such a way that the safety circuit becomes ineffective when the switch 32 is actuated. As a result, when the brake line pressure becomes lower than the threshold value, the lock-prevention system is immediately effective again, if the driver had previously and unintentionally exceeded the threshold value because of an excessively forceful actuation of the brake.

In an extension of this type of circuit, the switch 32 can also be used in that the override of the lock-prevention regulation is indicated by the warning lamp 33. However, because of the intermediate action of the electronic switching system 45, this indication is effective only in case the lock-prevention had already been actuated prior to achieving the threshold value. This case is registered in the switching system 45 by a switching signal which recognizes the actual operation of the lock-prevention.

Figure 4:
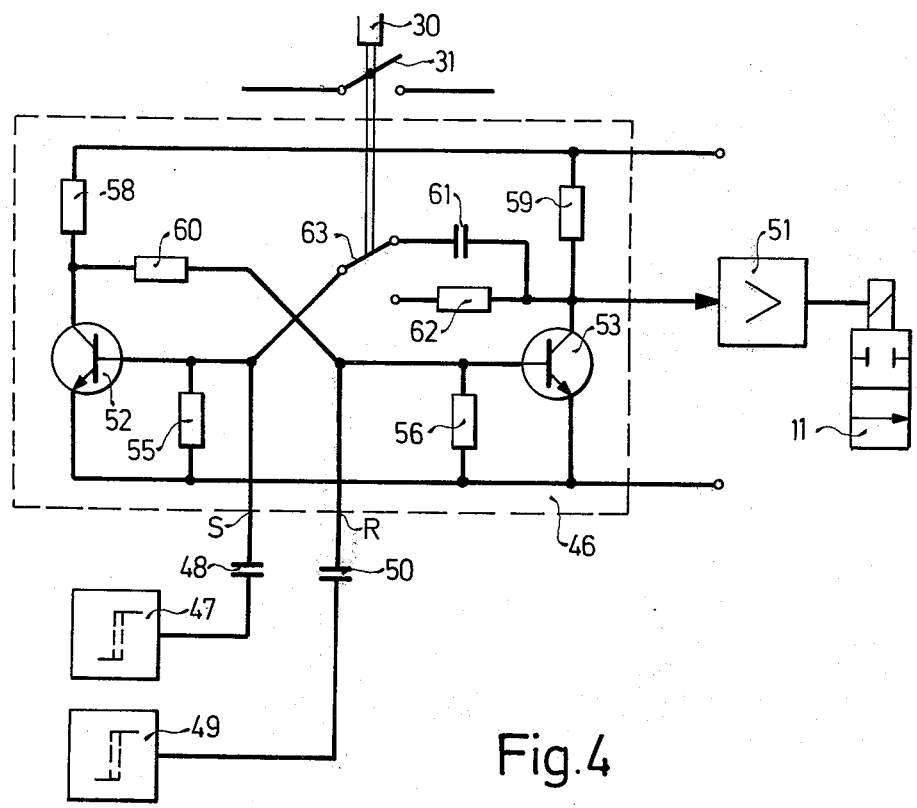
FIG. 4 illustrates a connection.

In FIG. 4 there is shown a part of the switching system 45 in more detail. The outlet valve 11 is connected to an electronic storage device 46 via a power amplifier 51. For the other outlet valves there are provided similar storage devices not shown in FIG. 4.

The storage device 46 is provided with a SET input S and a RESET input R. Two threshold switches 47,49 are connected via capacitors 48,50 with the inputs S and R, respectively.

Two transistors 52,53 are interconnected in a manner similar to a flip-flop to build up the storage device 46. A negative bus 54 is connected directly to the emitters and via resistors 55,56 to the bases, whereas a positive bus 57 is connected via resistors 58,59 to the collectors of the transistors 52,53. The bases of the transistors 52,53 are used as the inputs S and R, respectively.

A resistor 60 links the collector of the first transistor 52 to the base of the second transistor 53. A similar linkage between the base of the first transistor 52 and the collector of the second transistor 53 is formed by a capacitor 61 or a resistor 62 depending on the position of a selecting switch 63 which is actuated by the switching rod 30 simultaneously with the switch 32.

During normal operation the storage device 46 is set by a positive pulse generated by the first threshold switch 47 which responds to a threshold value of wheel deceleration. This occurs with incipient wheel locking. Braking pressure decreases during the following time period due to the operation of the outlet valve 11. Pressure decreasing is terminated when the storage device 46 is reset by a positive pulse generated by the second threshold switch 49 which responds to a threshold value of wheel acceleration. This operation of the storage device 46 is well known in the art.

Storage device 46 is actually a monostable flip-flop, having, however, a reset terminal to reset the having, in advance of the expiration time of its unstable state. FF 46 is built as a monostable FF for safety reason. In ordinary operation, the monostable FF is alternately controlled by the two inputs and acts like a normal bistable flip-flop. If, however, the element 46 should be set by an extraneous disturbance or noise pulse, not due to blocking of the rear wheels of the vehicle, prolonged drainage of brake fluid from the brakes is prevented by the automatic reset feature, that is the monostable feature of FF 46. Likewise, if the FF 46 had been set by a control pulse but, for some reason, the reset pulse is missing, the FF will reset automatically. The time delay of automatic resetting of FF 46 is, preferably, in the order of about 400 to 500 milliseconds, so that any pressure drop due to stray pulses is automatically terminated after this time lapse.

The monostable operation of the storage device 46 is caused by the capacitor 61 when the selecting switch 63 is in its normal position shown in FIG. 4. When in a case of emergency the braking pressure is so high that selecting switch 63 is thrown over to its second position by switching rod 30 the operation of the storage device 46 becomes bistable and the automatic reset cannot take place. After termination of the emergency braking the pressure can drop immediately even if no signal is generated by the first threshold switch.

That which is claimed is:

1. In a two-circuit braking system for motor vehicles having a brake pedal, a wheel lock-prevention device that holds the brake line pressure below a locking limit pressure by means of sensors in the system and magnetic valves included in each circuit, the improvement comprising:
    a. switching valve means connected to both circuits;
    b. means mechanically connecting the brake pedal to said switching valve means; and
    c. bypass means connecting at least one of the two circuits to said switching valve means, wherein
    said switching valve means has a threshold value associated therewith and is switched in dependence on said threshold value such that said bypass means is placed into open communication with its respective circuit, wherein
    said threshold value is a particular value of the force applied to the brake pedal, and wherein
    at least some of the magnetic valves are rendered ineffective due to the switching of said switching valve means so that a braking pressure increase without lock-prevention is achieved.

2. The two-circuit braking system as defined in claim 1, wherein a first one of the circuits controls the braking of the front wheels of the vehicle and the second one of the circuits controls the braking of the rear wheels of the vehicle, with the first one of the circuits having a separate branch including magnetic valves for each front wheel, and wherein the magnetic valves within the first circuit are rendered ineffective when the bypass means connecting the first circuit with said switching valve means is placed into said open communication, thereby achieving a pressure increase in the first circuit without lock-prevention.

3. The two-circuit braking system as defined in claim 1, wherein a first one of the circuits controls the braking of the front wheels of the vehicle and the second one of the circuits controls the braking of the rear wheels of the vehicle, and wherein a pressure difference between the two circuits as a result of an erroneous position of at least one of the magnetic valves in either of the two circuits actuates the switching valve means after the threshold value is reached.

4. The two-circuit braking system as defined in claim 1, wherein said switching valve means includes spring means which retains said switching valve means in a starting position prior to achieving said threshold value and permits switching of said switching valve means after achievement of said threshold value whereby the switching valve means is rendered capable of bypassing the lock-prevention system of said first circuit.

5. The two-circuit braking system as defined in claim 1, wherein a first one of the circuits controls the braking of the front wheels of the vehicle and the second one of the circuits controls the braking of the rear wheels of the vehicle, wherein a portion of said first circuit lies in front of its lock-prevention device and another portion thereof lies behind its lock-prevention device, wherein the braking system further includes a relief line, and wherein said switching valve means in its switched over position closes said relief line and connects both portions of said first circuit.

6. The two-circuit braking system as defined in claim 1, wherein the braking system further includes a warning lamp, a switch and means connecting said switch to said switching valve means, whereby said switching valve means closes said switch for energizing said warning light when in its switched position.

7. The two-circuit braking system as defined in claim 6, wherein the magnetic valves in each circuit are arranged as inlet and outlet magnetic valve pairs, wherein the braking system further includes a safety circuit connected to a magnetic outlet valve and to said switch for determining the time duration that the connected magnetic outlet valve is on, and wherein the current in the circuit including the switch influences the safety circuit such that the safety circuit is ineffective when the switch is closed.

8. The two-circuit braking system as defined in claim 7, wherein said safety circuit is included within an electronic switching device, wherein the circuit including the switch, the warning lamp and the electronic switching device carries current when the switch is closed through the warning lamp and the electronic switching device only after a switching signal has passed through the electronic switching device and which is indicative of the fact that the lock-prevention device has been actuated.

9. In a two-circuit braking system for motor vehicles having a wheel lock-prevention device that holds the brake line pressure below a locking limit pressure by means of sensors in the system and magnetic valves included in each circuit, the improvement comprising:
 a. switching valve means;
 b. bypass means connecting at least one of the two circuits to said switching valve means;
 c. a warning lamp;
 d. a switch;
 e. means connecting said switch to said switching valve means;
 f. a safety circuit; and
 g. a magnetic outlet valve, wherein
  said switching valve means has a threshold value associated therewith and is switched in dependence on said threshold value such that said bypass means is placed into open communication with its respective circuit;
  said switching valve means closes said switch for energizing said warning light when in its switched position;
  the magnetic valves in each circuit are arranged as inlet and outlet magnetic valve pairs;
  said safety circuit is connected to said magnetic outlet valve and to said switch for determining the time duration that the connected magnetic outlet valve is on;
  the current in the circuit including the switch influences the safety circuit such that the safety circuit is ineffective when the switch is closed; and
  at least some of the magnetic valves are rendered ineffective due to the switching of said switching valve means so that a braking pressure increase without lock-prevention is achieved.

10. The two-circuit braking system as defined in claim 9, wherein said safety circuit is included within an electronic switching device, wherein the circuit including the switch, the warning lamp and the electronic switching device carries current when the switch is closed through the warning lamp and the electronic switching device only after a switching signal has passed through the electronic switching device and which is indicative of the fact that the lock-prevention device has been actuated.

* * * * *